(12) United States Patent
Hausler et al.

(10) Patent No.: US 8,736,784 B2
(45) Date of Patent: May 27, 2014

(54) DUAL COMPARTMENT ENVIRONMENTAL SEAL

(75) Inventors: George Charles Hausler, Maple Grove, MN (US); Daniel Ronald Schwartz, Hopkins, MN (US); Tyler Matthew Thompson, Chanhassen, MN (US)

(73) Assignee: Rosemount Inc., Chanhassen, MN (US)

( * ) Notice: Subject to any disclaimer, the term of this patent is extended or adjusted under 35 U.S.C. 154(b) by 170 days.

(21) Appl. No.: 13/493,097

(22) Filed: Jun. 11, 2012

(65) Prior Publication Data

US 2013/0329159 A1 Dec. 12, 2013

(51) Int. Cl.
*G02F 1/1333* (2006.01)

(52) U.S. Cl.
USPC .............................................. 349/58; 439/521

(58) Field of Classification Search
CPC ...... G02B 6/4248; G02F 1/1333; H02G 3/18; H02G 15/013; H02G 15/04; H02G 15/046; H02G 3/088; H02G 3/22; H05K 13/00; H01R 13/5205; H01R 13/523; H01R 13/5219; H01R 13/52; H01R 13/5202; H01R 13/5816; H01R 13/6582; H01R 13/426; H01R 13/436; H01R 13/59; H01R 4/26; H01R 4/5025; H01R 4/643; H01R 31/06
USPC ........ 439/271, 190, 587, 519, 521; 174/77 R, 174/652, 653; 277/308, 529; 349/58, 187; 29/592.1
See application file for complete search history.

(56) References Cited

U.S. PATENT DOCUMENTS

| | | | |
|---|---|---|---|
| 4,623,266 A | 11/1986 | Kielb | |
| 6,062,095 A | 5/2000 | Mulrooney et al. | |
| 6,457,367 B1 | 10/2002 | Behm et al. | |
| 6,508,131 B2 | 1/2003 | Frick | |
| 6,511,337 B1 | 1/2003 | Fandrey et al. | |
| 2005/0037656 A1* | 2/2005 | Cairns ........................... | 439/353 |
| 2006/0141829 A1 | 6/2006 | Kauth | |
| 2009/0311975 A1 | 12/2009 | Vanderaa et al. | |
| 2011/0058313 A1 | 3/2011 | Hausler et al. | |
| 2011/0215944 A1 | 9/2011 | Causler et al. | |
| 2012/0142207 A1 | 6/2012 | Duval et al. | |

OTHER PUBLICATIONS

International Search Report and Written Opinion, mailed Aug. 27, 2013.

* cited by examiner

*Primary Examiner* — Thoi Duong
(74) *Attorney, Agent, or Firm* — Kinney & Lange, P.A.

(57) ABSTRACT

An environmental seal between two compartments, such as in a process transmitter, linked by a passageway contains an electrical cable. The seal includes a stop, a cable gland body, a compression bushing, a cable gland nut, and a first elastomeric seal. The stop projects from an interior surface of the passageway. The cable gland body is in contact with the stop and encircles a portion of the electrical cable. The compression bushing is within the cable gland body and encircles the portion of the electrical cable. The cable gland nut compresses the compression bushing and seals the compression bushing against the electrical cable and against an interior surface of the cable gland body. The first elastomeric seal seals between an exterior surface of the cable gland body and the interior surface of the passageway.

24 Claims, 3 Drawing Sheets

DUAL COMPARTMENT ENVIRONMENTAL SEAL

BACKGROUND

The present invention relates generally to field devices for process measurement and control. Specifically, the invention concerns isolating electronics from environmental effects in a process transmitter.

Field devices cover a broad range of process management devices that measure and control parameters such as pressure, temperature, and flow rate. A process transmitter is a type of field device in communication with a transducer, for example a sensor or an actuator, and also in communication with a remote monitoring or control device, such as a computer. The output signal of a sensor, for example, is generally insufficient to communicate effectively with a remote monitoring or control device. The process transmitter bridges the gap by receiving the communication from the sensor, converting the signal to a form more effective for longer distance communication, for example a modulated 4-20 mA current loop signal, or a wireless protocol signal, and transmitting the converted signal over a current loop or through a wireless field device network to the remote monitoring or control device.

Process transmitters often employ a dual-compartment housing. In a typical dual-compartment housing, one compartment contains process transmitter electronics and the other contains a terminal block to provide field connections to the process transmitter electronics for, for example, process control loop wires. Dual-compartment housings are often cylindrical, with the two compartments in a back-to-back arrangement separated by a central wall. Electrical connections between the terminal block and the process transmitter electronics pass through this central wall. The terminal block compartment is accessible from one side and the process electronics compartment is accessible from the other.

Process electronics must be protected from external environmental hazards, such as moisture, dirt, and radio frequency interference (RFI). Failure to adequately isolate the process electronics may cause erroneous signal conversions, communication disruption, and process transmitter failure. The terminal block compartment is occasionally opened in the field, exposing the compartment and components inside to the external environmental hazards. In addition, conduits carrying field connection wiring often connect directly to the terminal block compartment and may carry moisture into the compartment. The terminal block components are not typically sensitive to the effects of the external environmental hazards, but the electrical connections passing through the central wall between the terminal block and the process transmitter electronics can act as a pathway to carry the external environmental hazards into the electronics compartment. Thus, an environmental seal of the electrical connections between the two compartments is necessary to isolate and protect the process transmitter electronics from the external environmental hazards.

Unfortunately, solutions that provide an effective environmental seal in the case of a typical back-to-back cylindrical configuration of the dual-compartment housing are often not suitable for other dual-compartment configurations.

SUMMARY

An embodiment of the present invention is an environmental seal between two compartments, such as in a process transmitter, linked by a passageway containing an electrical cable. The seal includes a stop, a cable gland body, a compression bushing, a cable gland nut, and a first elastomeric seal. The stop projects from an interior surface of the passageway. The cable gland body is in contact with the stop and encircles a portion of the electrical cable. The compression bushing is within the cable gland body and encircles the portion of the electrical cable. The cable gland nut compresses the compression bushing and seals the compression bushing against the electrical cable and against an interior surface of the cable gland body. The first elastomeric seal seals between an exterior surface of the cable gland body and the interior surface of the passageway.

DETAILED DESCRIPTION

The present invention is an environmental seal between compartments of a dual-compartment housing. The invention is well suited for applications of a dual-compartment housing for a process transmitter which, for example, require access to both compartments on the same side of the process transmitter. Such a configuration typically requires a relatively lengthy passageway between the compartments which are necessarily in a side-by-side configuration, instead of a thin, central wall in the back-to-back configuration. The present invention is an effective environmental seal between the compartments of a dual-compartment housing that is also cost-effective and simple to construct.

Figure 1:
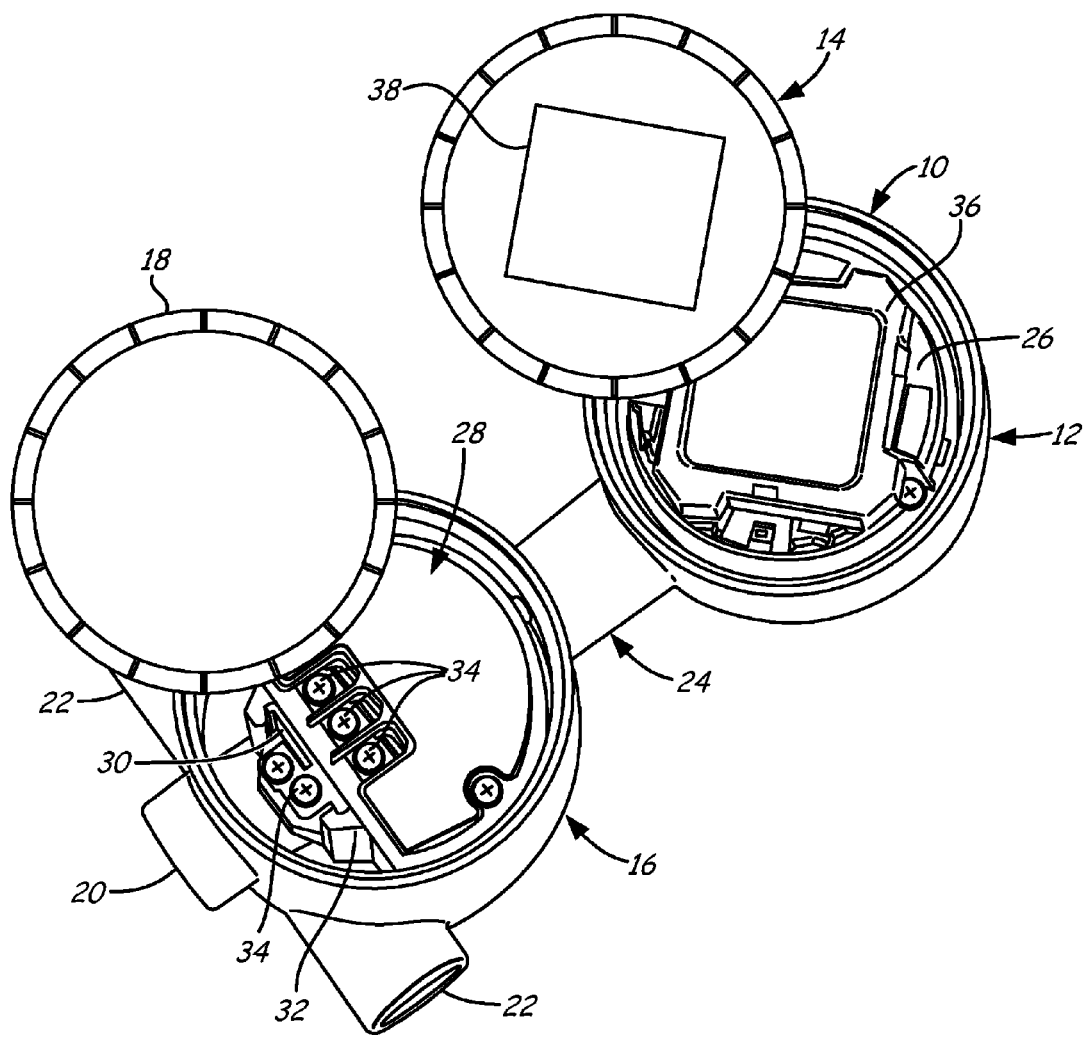
FIG. 1 is a representative diagram of a process transmitter including a side-by-side dual-compartment housing that embodies the environmental seal of the present invention.

FIG. 1 is a representative diagram of a process transmitter including a side-by-side dual-compartment housing that embodies the environmental seal of the present invention. According to this embodiment, FIG. 1 shows process transmitter housing 10, including electronics compartment 12, electronics compartment cover 14, terminal block compartment 16, terminal block compartment cover 18, top conduit opening 20, side conduit openings 22, and passageway 24. Electronics compartment 12 contains process transmitter electronics 26. Terminal block compartment 16 contains terminal block 28, conductive plate 30, and internal structure 32. Terminal block 28 includes terminal block connections 34. The embodiment illustrated in FIG. 1 also shows electronics compartment 12 with an optional liquid crystal display 36 and electronics compartment cover 14 includes corresponding display window 38. Process transmitter housing 10 is preferably made of metal, for example, stainless steel or aluminum.

Passageway 24 connects electronics compartment 12 to terminal block compartment 16. Process transmitter electronics 26 are within electronics compartment 12, as is optional liquid crystal display 36. Electronics compartment cover 14 fits over electronics compartment 12 to seal electronics compartment 12 such that liquid crystal display 36 is visible through display window 38. Terminal block 28 is within terminal block compartment 16 and is supported by internal support 32. Top conduit opening 20 and side conduit openings 22 provide for entry of field wiring (not shown), such as process control loop wiring. Field wiring attaches to terminal block connections 34. While top conduit opening 20 and side conduit openings 22 may be employed, typically not all are employed at once in a particular installation. Plugs (not shown) seal any unused conduit openings. Pursuant to one embodiment, conductive plate 30 is attached to internal structure 32 to cover void 44 in internal structure 32, as explained below in reference to FIG. 2. Terminal block compartment cover 18 fits over terminal block compartment 16 to seal terminal block compartment 16.

Figure 2:
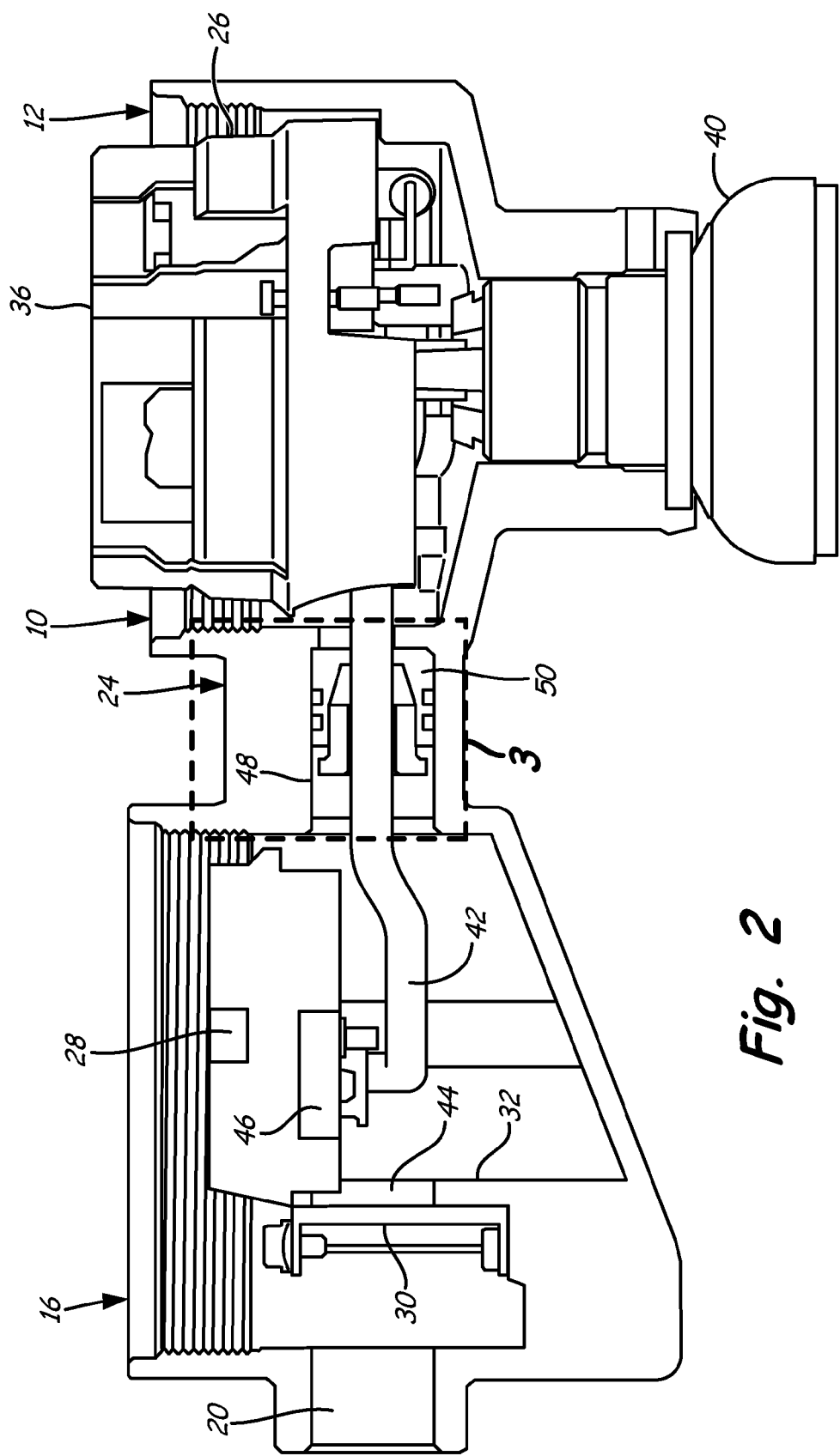
FIG. 2 is a cross-sectional representative diagram of the dual-compartment housing of FIG. 1.

FIG. 2 is a cross-sectional representative diagram of the dual-compartment housing of FIG. 1. In this embodiment, FIG. 2 shows process transmitter housing 10, including electronics compartment 12, terminal block compartment 16, top conduit opening 20, passageway 24, sensor module 40, and electrical cable 42. Electronics compartment 12 contains process transmitter electronics 26 and optional liquid crystal display 36. Terminal block compartment 16 contains terminal block 28, conductive plate 30, internal structure 32, and void 44. Terminal block 28 further includes terminal block potting compound 46. Passageway 24 includes interior passageway surface 48 and environmental seal 50.

As noted above, passageway 24 connects electronics compartment 12 to terminal block compartment 16. Preferably, conductive plate 30 is attached to internal structure 32 to cover void 44 in internal structure 32. Sensor module 40 is electrically connected to process transmitter electronics 26. Interior passageway surface 48 defines an opening connecting electronics compartment 12 to terminal block compartment 16. In the embodiment of FIG. 2, the opening defined by interior passageway surface 48 is approximately a cylinder. Electrical cable 42 passes through passageway 24 to electrically connect process transmitter electronics 26 to terminal block 28. Preferably, terminal block potting compound 46 seals electrical cable 42 and terminal block 28 at a point where electrical cable 42 connects to terminal block 28 to seal electrical cable 42. Environmental seal 50 encircles electrical cable 42 within passageway 24 to seal passageway 24 while permitting passage of electrical cable 42.

Considering FIGS. 1 and 2 together, in operation, sensor module 40 produces a sensor output signal which is received by process transmitter electronics 26. Process transmitter electronics 26 process the sensor output signal by, for example, adjusting it to compensate for characterized non-linearity effects of the sensor and compensating it for temperature effects. Process transmitter electronics 26 then transforms the compensated sensor signal into a transmitter signal. The transmitter signal is in a form more effective for long distance communication, for example, a modulated 4-20 mA current loop signal. Electrical cable 42 conducts the transmitter signal from process electronics 26 through passageway 24 to terminal block 28. The transmitter signal is then transmitted from terminal block 28 to a remote monitoring or control device (not shown) over field wiring attached to terminal block connections 34.

Seal integrity of electronics compartment 12 is essential for process transmitter electronics 26 to function properly and reliably. External environmental hazards, such as moisture, dirt, and radio frequency interference (RFI) must be sealed out. Sensor module 40 is itself typically well sealed, as is its connection to process transmitter housing 10, so it is typically not a source of external environmental hazards. Similarly, electronics compartment cover 14 is well sealed against electronics compartment 12. In contrast, although terminal block cover 18 also seals well against terminal block compartment 16, terminal block cover 18 is often removed in the field and may not be reinstalled. Conduits connected to terminal block compartment 16 may also provide a source of external environmental hazards. If unsealed, passageway 24 directly exposes electronics compartment 12 to any external environmental hazards present in terminal block compartment 16. Environmental seal 50 seals passageway 24, thus preventing exposure of process transmitter electronics 26 to any external environmental hazards present in terminal block compartment 16.

Figure 3:
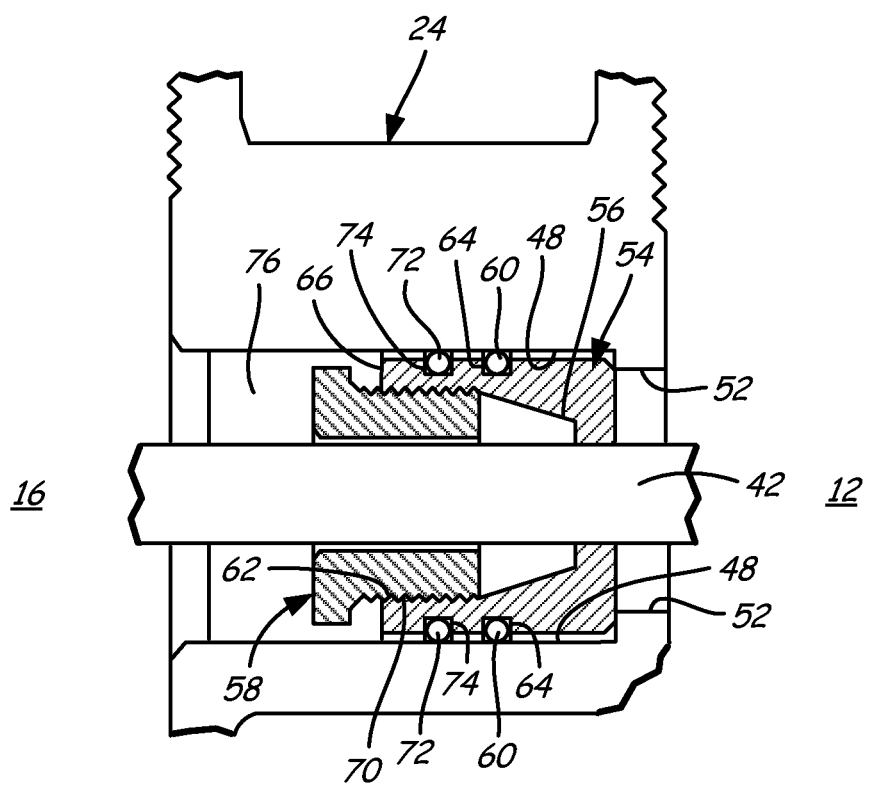
FIG. 3 is an enlarged view of the environmental seal of FIG. 2.

FIG. 3 provides an enlarged view of the environmental seal of FIG. 2. FIG. 3 illustrates passageway 24 between electronics compartment 12 and terminal block compartment 16, including a portion of electrical cable 42 and environmental seal 50. According to this embodiment, environmental seal 50 includes stop 52, cable gland body 54, compression bushing 56, cable gland nut 58, and first elastomeric seal 60. Stop 52 projects from interior passageway surface 48. Compression bushing 56 is an elastomeric bushing preferably having a frustoconical shape. Cable gland nut 58 includes exterior threads 62. Cable gland body 54 includes first sealing channel 64, threaded end 66, and interior threads 70 complementing exterior threads 62 of nut 58. Interior threads 70 are at threaded end 66. Cable gland body 54 and cable gland nut 58 are preferably made of metal, for example, stainless steel or aluminum.

Environmental seal 50 is created by inserting electrical cable 42 through cable gland nut 58, then inserting electrical cable 42 through compression bushing 56. First elastomeric seal 60 is fitted into first sealing channel 64 on an exterior surface of cable gland body 54 before inserting electrical cable 42 through cable gland body 54. Cable gland body 54 is positioned by, for example, a positioning fixture (not shown); to be at a proper location along the length of electrical cable 42 such that sufficient lengths of electrical cable 42 are available on either side of environmental seal 50 for attachment to terminal block 28 and process transmitter electronics 26. Next, compression bushing 56 is inserted into cable gland body 54, followed by threading cable gland nut 58 into cable gland body 54 with exterior threads 62 engaging interior threads 70. Cable gland nut 58 is tightened sufficiently to compress compression bushing 56 against both electrical cable 42 and cable gland body 54. Then, electrical cable 42 is inserted into passageway 24 and cable gland body 54 is pressed into passageway 24 until it contacts stop 52 with first elastomeric seal 60 engaging interior passageway surface 48.

The method described above for creating environmental seal 50 is particularly useful when, for reasons of production ease and reduced costs, terminal block 28 is connected to electrical cable 42 prior to installing electrical cable 42 and environmental seal 50 into process transmitter housing 10. For example, electrical cable 42 is electrically and physically connected to terminal block 28, then the connection sealed with terminal block potting 46. This serves to prevent moisture from entering electrical cable 42 at an otherwise open end within terminal block compartment 16, wicking along the length of electrical cable 42, and into electronics compartment 12.

Once installed environmental seal 50 provides an environmental seal between electronics compartment 12 and terminal block compartment 16. Compression bushing 56 seals between cable gland body 54 and electrical wire 42. First elastomeric seal 60, partially contained by first sealing channel 64, seals between cable gland body 54 and interior passageway surface 48. Thus, environmental seal 50 effectively seals out moisture and dirt from electronics compartment 12. In addition, because cable gland body 54 and cable gland nut 58 are preferably made of metal, and cable gland body 54 contacts stop 52, environmental seal 50 also provides RFI shielding.

In some applications, additional sealing features may be useful to provide further improvement in the quality of environmental sealing. The embodiment shown in FIG. 3 also illustrates two additional seals that may be included to further enhance environmental seal 50.

For the first additional seal, environmental seal 50 may include second elastomeric seal 72 and cable gland body 54 may also include second sealing channel 74. Second elastomeric seal 72 is fitted into second sealing channel 74 on the exterior surface of cable gland body 54 when first elastomeric seal 60 is fitted, before inserting electrical cable 42 through cable gland body 54. Second elastomeric seal 72, partially contained by second sealing channel 74, seals between cable gland body 54 and interior passageway surface 48. Thus, together, first elastomeric seal 60 and second elastomeric seal 72 provide a dual seal.

For the second additional seal, environmental seal 50 may preferably include potting compound 76. Once cable gland body 54 is pressed into passageway 24 until it contacts stop 52, potting compound 76 is deposited into passageway 24 on a side of cable gland 54 opposite stop 52. Potting compound 76 is then cured to further seal between electrical cable 42, cable gland body 54, cable gland nut 58, and interior passageway surface 48. Although either second elastomeric seal 72 or potting compound 76 may be added to first elastomeric seal 60 independently, employing all three seals together provides an enhanced level of environmental sealing.

The embodiment of present invention are simple to construct, even if the basic structure of process transmitter housing 10 is cast as a single metal piece. For example, top conduit opening 20 shown in FIGS. 1 and 2 may be aligned with an axis of passageway 24 defined by interior passageway surface 48 which is a cylinder. So aligned, passageway 24 is easily machined through top conduit opening 20 from terminal block compartment 16 by any of known methods to produce interior passageway surface 48, for example, drilling, routing, etc., while stopping short of electronics compartment 12 to create stop 52. Further, should terminal block compartment 16 contain an intervening structure, such as internal structure 32, void 44 may be machined through top conduit 20 (or formed as part of casting of process transmitter housing 10), such that void 44 has a diameter at least as large as the desired diameter of interior passageway surface 48 and does not interfere with machining interior passageway surface 48 through top conduit 20. Once such machining is completed, conductive plate 30 may be preferably attached to internal structure 32 to cover void 44 in internal structure 32 to preserve RFI shielding of electrical cable 42 and process transmitter electronics 26.

Although the embodiments described above illustrate stop 52 at a point where interior passageway surface 48 opens into electronics compartment 12, it is understood that the invention encompasses embodiments where a stop is at a point where an interior passageway surface opens into a terminal block compartment and an electrical cable and a cable gland body are inserted from an electrical compartment.

In the embodiment described above, interior passageway surface 48 and cable gland body 54 are preferably cylindrical in shape and first and second elastomeric seals 60, 72 are preferably o-rings. Embodiments of the present invention may employ non-cylindrical interior passageway surfaces and cable gland bodies.

The present invention is well suited for applications of a dual-compartment housing for a process transmitter which, for example, require access to both compartments on the same side of the process transmitter. The relatively lengthy passageway between the compartments characteristic of a side-by-side configuration, requires an innovative seal. As described above, the present invention employs an innovative, effective environmental seal between the compartments of a dual-compartment housing that is also cost-effective and simple to construct.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An environmental seal between two compartments linked by a passageway containing an electrical cable, the seal comprising:
    a stop projecting from an interior surface of the passageway;
    a cable gland body within the passageway and in contact with the stop, the cable gland body encircling a portion of the electrical cable;
    a compression bushing within the cable gland body and encircling the portion of the electrical cable;
    a cable gland nut to compress the compression bushing and seal the compression bushing against the electrical cable and against an interior surface of the cable gland body; and
    a first elastomeric seal to seal between an exterior surface of the cable gland body and the interior surface of the passageway.

2. The seal of claim 1, wherein the cable gland body includes a threaded end, the threaded end including threads on the interior surface of the cable gland body; and the cable gland nut includes threads on an exterior surface of the cable gland nut for engaging the threads of the cable gland body at the threaded end.

3. The seal of claim 1, wherein the first elastomeric seal is an o-ring seal.

4. The seal of claim 1, wherein the cable gland body and the cable gland nut are made of metal.

5. The seal of claim 1, wherein the cable gland body includes a first sealing channel on the exterior surface of the cable gland body; and the first elastomeric seal is partially contained by the first sealing channel.

6. The seal of claim 5, further comprising:
    a second sealing channel on the exterior surface of the cable gland body; and
    a second elastomeric seal partially contained by the second sealing channel and the interior surface of the passageway.

7. The seal of claim 6, further comprising:
    potting compound at least partially filling the passageway at a point where the passageway opens the other of the two compartments to further seal between the electrical cable, the cable gland body, the cable gland nut, and the interior surface of the passageway.

8. A dual-compartment housing for a process transmitter, the housing comprising:
    a first compartment containing process transmitter electronics;
    a second compartment containing a terminal block;
    a passageway linking the first compartment to the second compartment;

an electrical cable passing through the passageway and electrically connecting the process transmitter electronics and the terminal block; and an environmental seal within the passageway, the seal including:
- a stop projecting from an interior surface of the passageway;
- a cable gland body within the passageway and in contact with the stop, the cable gland encircling a portion of the electrical cable;
- a compression bushing within the cable gland body and encircling the portion of the electrical cable;
- a cable gland nut to compress the compression bushing and seal the compression bushing against the electrical cable and against an interior surface of the cable gland body; and
- a first elastomeric seal to seal between an exterior surface of the cable gland body and the interior surface of the passageway.

9. The housing of claim 8, wherein the cable gland body includes a threaded end, the threaded end including threads on the interior surface of the cable gland body; and the cable gland nut includes threads on an exterior surface of the cable gland nut for engaging the threads of the cable gland body at the threaded end.

10. The housing of claim 8, wherein the cable gland body and the cable gland nut are made of metal.

11. The housing of claim 8, wherein the cable gland body includes a first sealing channel on the exterior surface of the cable gland body; and the first elastomeric seal is partially contained by the first sealing channel.

12. The housing of claim 11, wherein the environmental seal further includes:
- a second sealing channel on the exterior surface of the cable gland body; and
- a second elastomeric seal partially contained by the second sealing channel and the interior surface of the passageway.

13. The housing of claim 12, wherein the first elastomeric seal and the second elastomeric seal are o-ring seals.

14. The housing of claim 8, wherein the environmental seal further includes:
- potting compound at least partially filling the passageway at a point where the passageway opens the other of the two compartments to further seal between the electrical cable, the cable gland body, the cable gland nut, and the interior surface of the passageway.

15. The housing of claim 8, wherein the first compartment, the second compartment, and the passageway are a single piece of metal.

16. The housing of claim 8, wherein the terminal block includes potting compound sealing the electrical cable and the terminal block at a point where the electrical cable connects to the terminal block to seal the electrical cable.

17. The housing of claim 8, wherein the passageway is a cylinder and the second compartment includes a plurality of conduit entries, one of the conduit entries aligned with an axis of the passageway to permit machining of the interior surface of the passageway.

18. The housing of claim 17, wherein the second compartment contains an internal structure supporting the terminal block; the internal structure between the conduit entry aligned with the axis of the passageway and the passageway; the internal structure including a void aligned with the axis of the passageway and having a diameter at least as large as a diameter of the passageway to permit machining of the interior surface of the passageway.

19. The housing of claim 18, wherein the second compartment contains a conductive plate covering the void.

20. The housing of claim 8, wherein the first compartment includes a first compartment cover and the second compartment further includes a second compartment cover, the first compartment cover, and the second compartment cover oriented in the same direction.

21. The housing of claim 20, wherein the first compartment further includes a liquid crystal display and the first compartment cover includes a window.

22. A method for providing an environmental seal in a passageway containing an electrical cable between compartments of a dual-compartment housing of a process transmitter, the method comprising:
- inserting the electrical cable through a cable gland nut;
- inserting the electrical cable through a compression bushing;
- fitting a first elastomeric seal against an exterior surface of a cable gland body;
- inserting the electrical cable through the cable gland body;
- positioning the cable gland body along the length of the electrical cable;
- inserting the compression bushing into the cable gland body;
- threading the cable gland nut into the cable gland body;
- tightening the threaded cable gland nut to compress the compression bushing against the electrical cable and the cable gland body;
- inserting the electrical cable into the passageway; and
- pressing the cable gland body into the passageway until the cable gland body seats against a stop projecting from an interior surface of the passageway to seal the first elastomeric seal against the interior surface of the passageway.

23. The method of claim 22, further comprising:
- fitting a second elastomeric seal against the exterior surface of the cable gland body prior to inserting the electrical cable through the cable gland body;
- wherein pressing the cable gland body into the passageway also seals the second elastomeric seal against the interior surface of the passageway.

24. The method of claim 23, further comprising:
- depositing potting compound into the passageway on a side of the cable gland body opposite the stop; and
- curing the potting compound to further seal between the electrical cable, the cable gland body, the cable gland nut, and the interior surface of the passageway.

* * * * *